United States Patent [19]

Büngert

[11] Patent Number: 4,536,105
[45] Date of Patent: Aug. 20, 1985

[54] PIPE DIVIDER FOR PIPES CONVEYING SOLIDS OR DISPERSIONS

[75] Inventor: Theodor Büngert, Wiesbaden, Fed. Rep. of Germany

[73] Assignee: Hoechst Aktiengesellschaft, Frankfurt am Main, Fed. Rep. of Germany

[21] Appl. No.: 579,462

[22] Filed: Feb. 13, 1984

[30] Foreign Application Priority Data

Feb. 14, 1983 [DE] Fed. Rep. of Germany ....... 3305079

[51] Int. Cl.³ .............................................. B65G 53/56
[52] U.S. Cl. .................................... 406/183; 137/883; 137/885; 251/61.1
[58] Field of Search ............... 406/181, 183; 251/61.1; 137/860, 863, 872, 874, 883, 885

[56] References Cited

U.S. PATENT DOCUMENTS 2,598,207 5/1952 Bailey et al. ...................... 251/61.1
3,019,815 2/1962 Lenardon et al. .................. 137/883
3,556,139 1/1971 Yalovega ........................ 251/61.1 X
4,085,776 4/1978 Derrick, Jr. ..................... 137/561 A

FOREIGN PATENT DOCUMENTS 1243096 6/1967 Fed. Rep. of Germany ...... 406/181

Primary Examiner—Jeffrey V. Nase
Attorney, Agent, or Firm—Schwartz, Jeffery, Schwaab, Mack, Blumenthal & Evans

[57] ABSTRACT

Disclosed is a pipe divider for pipes used to convey solids of small particle size or dispersions, constructed such that a feed pipe leads into a distributor chamber, two distributor pipes lead away from this chamber and two tubes which can be pressurized by means of compressed air are provided in the distributor chamber between the feed pipe and the distributor pipes on both sides, for selectively blocking one of the branch paths. The feed pipe leads tangentially into the cylindrical distributor chamber, the distributor pipes lead tangentially away from the distributor chamber, and the distributor chamber includes an internal cylinder to which the tubes are mounted in such a way that they surround the internal cylinder. Owing to this special arrangement, only low mechanical and/or corrosive stresses occur.

7 Claims, 6 Drawing Figures

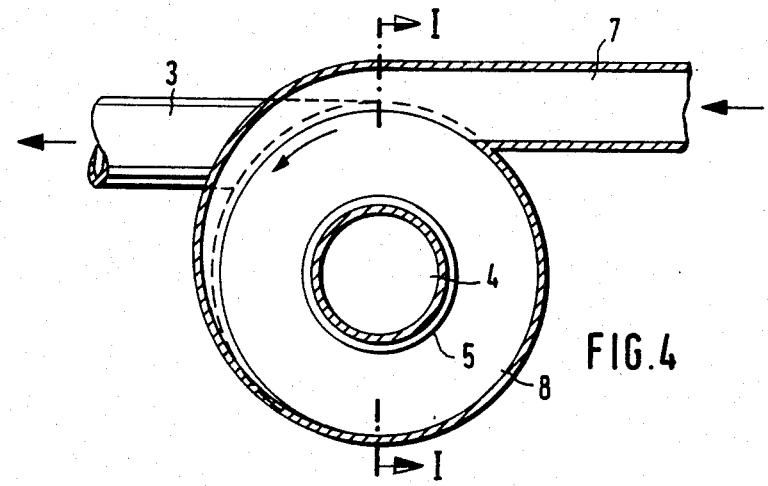
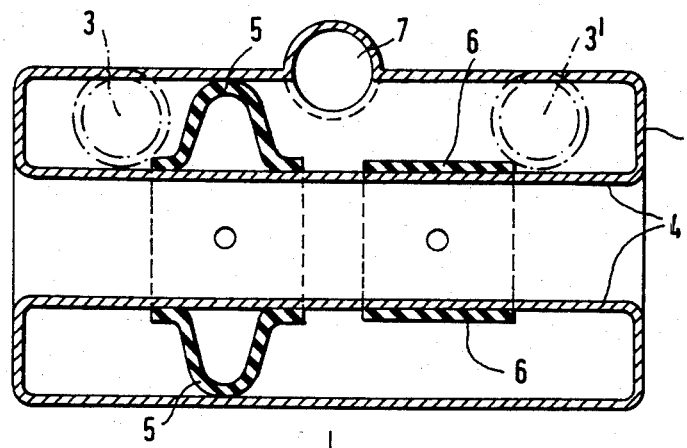
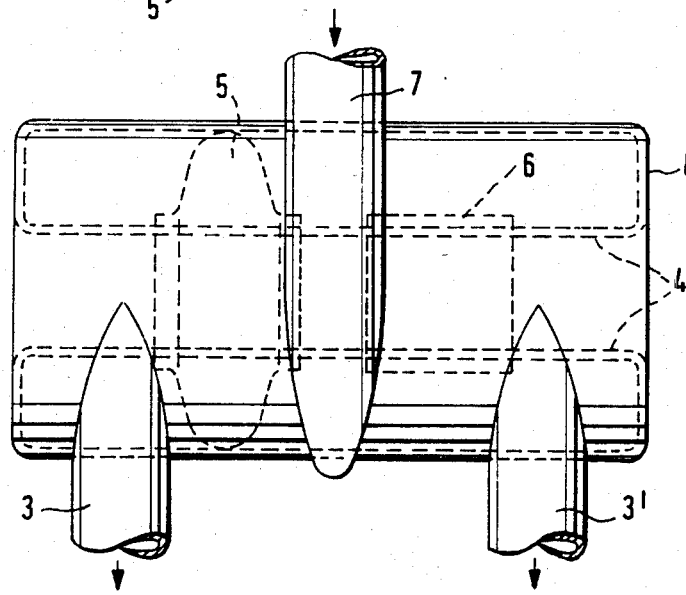

PIPE DIVIDER FOR PIPES CONVEYING SOLIDS OR DISPERSIONS

BACKGROUND OF THE INVENTION

The present invention relates to a pipe divider for pipes conveying solids of small particle size or dispersions, comprising a feed pipe, a distributor chamber and two distributor pipes.

Pipe dividers of this type are known and play an important role in the distribution of solids or of dispersions containing solids which are to be conveyed over at least two pipes. However, the substances or substance mixtures to be distributed frequently still contain components which can have a more or less aggressive behavior toward the materials of which these pipe dividers or components thereof are composed in practice. For example, these substances or substance mixtures can, for reasons of production engineering, still contain acids, bases or salts, which can then attack metals (corrosion). If, for example, due to the failure of seals, reduced mobility of components or the appearance of holes, such pipe dividers which have become unserviceable must be replaced, this represents not only a cost factor due to the replacement of material, but also a possible idling of production units which today frequently operate continuously. The state of the art has disclosed, for example, the following pipe dividers:

German Auslegeschrift No. 11 65 493 describes a pipe divider for the pneumatic conveyance of dusty or grainy material. The divider has the form of a bifurcated pipe and contains a ball, movable with play, provided as a sealing shut-off means.

German Auslegeschrift No. 12 44 055 discloses a two-way diaphragm divider for solids-laden liquid streams or gas streams, wherein two diaphragm sections, which can be subjected to compressed air for isolating one branch route or the other at will, are provided in the divider housing on both sides of the branching point.

The pipe branch for pneumatic conveying units according to German Auslegeschrift No. 12 50 346 is constructed in such a way that a feed pipe leads into a distributor chamber, from which a plurality of distributor pipes lead away, each distributor pipe having a shut-off means (valve). Cleaning-air nozzles directed onto points with a particularly high risk of deposits lead into the distributor chamber.

German Offenlegungsschrift No. 14 81 189 describes a line system for pneumatic conveying of solids in a carrier gas, which system has one inlet line and at least two outlet lines. Each of the outlet lines contains a valve which is arranged at a certain distance from the branching between the inlet and the outlet lines and, in the blocking state, causes the formation of a plug of the solid between the valve and the branch. The plug of solids is removed from the line either automatically when the valve is opened or by means of a flushing gas which is introduced into the system via a flushing gas inlet between the branching and the valve.

German Patent No. 15 56 320 and No. 17 81 388 disclose a revolving pipe divider for connecting an incoming pipe to one of several outgoing pipes via a revolving pipe, the outlet end of which is connected to the edge zone of a rotary disk, for pivoting about the axis of the inlet pipe.

The pipe divider for the pneumatic conveying of chemically corrosive dusty or grainy materials according to German Offenlegungsschrift No. 19 16 581 comprises a hollow cylindrical housing and a cylindrical cock which is rotatably arranged within the housing. A material feed line and at least two material discharge lines terminate within the shell surface of the housing. The cock of cheap cast material (for example, cast aluminum) contains channels which are formed by pipes of a resistant material (for example, chromium-nickel steel). The other components, coming into interaction with the material of the pipe divider are also made of a resistant material. Additionally, inflatable tubing rings can also be provided for sealing.

Under the demands of practice, however, these pipe dividers still have problems, in particular if the solids to be distributed are still moist, i.e., they tend to cake and/or to stick, or if the solids or dispersions still contain corrosive components. Very frequently, for example, blockages occur in the distributor pipes, or the shut-off means no longer close tightly. It has not been possible hitherto to completely overcome these problems, even by the use of tubing diaphragm, since the latter are very highly stressed mechanically by the solids particles impinging on them in the known arrangements, so that frequent dismantling and refitting or replacement of the pipe dividers are still necessary.

SUMMARY OF THE INVENTION

It is therefore an object of the present invention to provide a pipe divider which is suitable for distributing those solids or dispersions which still contain corrosive components or tend to cake or stick.

It is an additional object of the invention to produce a pipe divider wherein blockages do not occur in the distributor pipes, and wherein the shut-off means operate efficiently without requiring frequent refitting or replacement.

Still a further object of the invention is to produce a pipe divider which operates without the occurrence of high mechanical or corrosive stress on the functional components.

In accomplishing the foregoing objects, there has been provided in accordance with the present invention a pipe divider for use in pipes designed for conveying solids of small particle size or dispersions, comprising a feed pipe leading tangentially into a generally cylindrical distributor chamber, located such that the distance from the axis of the chamber to the axis of the feed pipe may be greater or less than the radius of the chamber, and two distributor pipes leading tangentially away from the chamber. Also provided are two tubes located within said chamber, such that a first tube is situated between the feed pipe and a first distributor pipe, and a second tube is situated between the feed pipe and a second distributor pipe. Further provided is an internal cylinder, located within said distributor chamber, to which the tubes are mounted in such a manner that they surround the internal cylinder, and means for pressurizing the two tubes for selectively blocking either one or both of the two distributor pipes.

Further objects, features and advantages of the present invention will become apparent from the detailed description of preferred embodiments which follows, when considered together with the attached drawings.

BRIEF DESCRIPTION OF THE DRAWINGS

In the drawings:

FIG. 4 is a cross-sectional view through a second pipe divider according to the invention;

FIG. 5 is a cross-sectional view through the second pipe divider at the level of line I—I in FIG. 4; and FIG. 6 is a plan view of the second pipe divider.

DETAILED DESCRIPTION OF THE PREFERRED EMBODIMENTS

Figure 1:
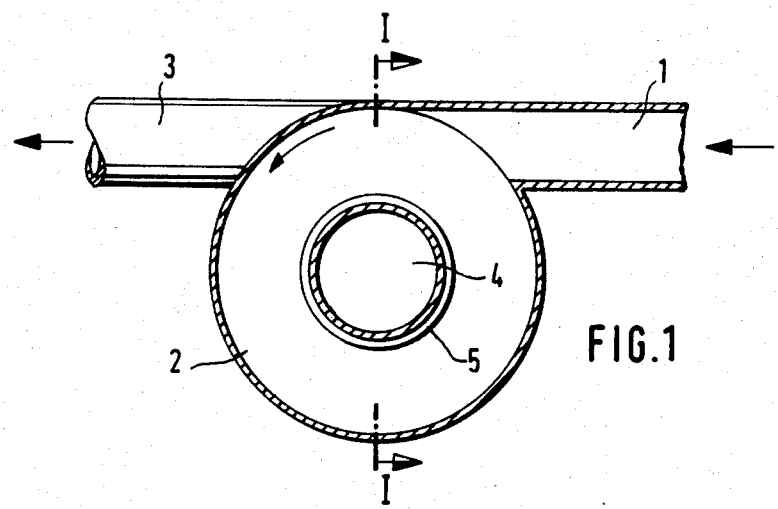
FIG. 1 is a cross-sectional view through a first pipe divider according to the invention.

The invention proceeds from the known pipe divider for pipes which convey solids or small particle size or dispersions, in which a feed pipe leads into a distributor chamber, two distributor pipes lead away from this chamber, and two tubes which can be pressurized by means of compressed air are provided in the distributor chamber between the feed pipe and the distributor pipes, on both sides, for selectively blocking one of the branch paths. The pipe divider according to the invention is characterized by the fact that a feed pipe leads tangentially into a generally cylindrical distributor chamber, the distributor pipes lead tangentially away from the distributor chamber, and the distributor chamber includes an internal cylinder to which the tubes are mounted in a way such that they surround the internal cylinder.

In this context, the term "tangentially" means that the center axis of the feed pipe or of the distributor pipes forms an angle of about 90° with a section plane along the axis through the distributor chamber, or an imaginary continuation of the upper contour line of the feed pipe in the direction of the distributor chamber is a tangent or runs parallel with the tangent to the periphery of the distributor chamber or very closely approaches the latter. In particular, at least one pipe, but preferably all pipes is/are arranged in such a way that the center axis/axes of the pipe(s) form(s) an angle of about 90° with the vertical section plane along the axis through the distributor chamber.

In practice, this tangential arrangement of the feed pipes relative to the cylindrical distributor chamber has the effect that the material which is to be conveyed (composed of solids of small particle size, for example, granules, powder or very fine powder which can also still contain moisture and/or by-products, or of a dispersion, for example, a dispersion of fibers in a solvent system) circulates in the distributor chamber on a circular or helical path, moving essentially in the space between the outer wall of the internal cylinder and the outer inner wall of the distributor chamber.

In a preferred embodiment, this circular or helical movement can be intensified by forcing the entering material to move in this way. This can, for example, be effected by leading the feed pipe tangentially into the distributor chamber, in a way such that an imaginary continuation of the upper contour line of the feed pipe in the direction of the distributor chamber is displaced parallel in an upward direction with respect to the periphery of the distributor chamber. The distance between the upper contour line and the central axis of the distributor chamber then decreases steadily, until it corresponds to the radius of the distributor chamber. Owing to the fact that, in the non-blocking state, the tubes which can be pressurized by means of compressed air are arranged such that they surround the outer wall of the (generally pipe-shaped) internal cylinder, there is in general no interaction or only a subordinate interaction between the tube material and the conveyed material, for the latter essentially circulates on or close to the outer inner wall of the cylindrical distributor chamber.

In order to convert one of the tubes into the blocking state, i.e., in order to block one of the two branch paths, compressed air is applied. The material entering the distributor chamber is thus forced to deflect in the direction of the other branch path, whereby the blocking tube is covered with material, which ensures an additional protection from mechanical stress.

Long-term tests unambiguously show that the pipe divider according to the invention works trouble-free, without the occurrence of high stresses on the functional component parts. This is because, compared with the state of the art, the divider of the invention has the advantage that those components which produce the distributing function are mechanically and/or corrosively stressed only to a very slight extent or not at all.

In a first embodiment of a pipe divider according to the invention (FIGS. 1 to 3), the material to be conveyed and distributed, for example, pulverulent methylhydroxyethyl cellulose from an intermediate stage of a production plant, having a content of about 45 to 50% by weight of dry matter, a moisture content of about 50 to 55% by weight, which moisture content comprises essentially water, but can also still contain fractions of organic solvents, such as alcohols, or acids or bases, and a salt content (for example, NaCl) or less than about 1% by weight, is fed through a feed pipe 1 tangentially into a cylindrical distributor chamber 2. The material is discharged from the distributor chamber 2 through the two distributor pipes 3,3' which are located on each side of the feed pipe 1 and through which the material leaves in a direction corresponding to the inlet direction; however, different outlet directions are also possible, depending on the particular operating requirements. Between the feed pipe 1 and the distributor pipes 3,3', a tube 5,6 of, for example, rubber, is provided on each side of the feed pipe. Both tubes are mounted to and surrounding the pipe-shaped internal cylinder 4 and are capable of being pressurized.

Figure 2:
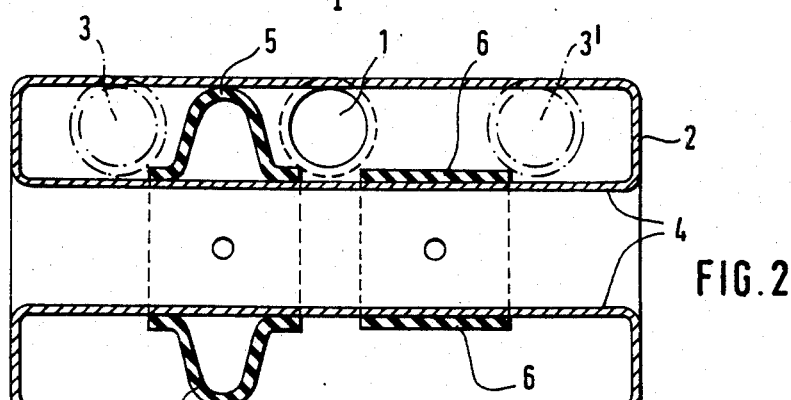
FIG. 2 is a cross-sectional view through the first pipe divider at the level of line I—I in FIG. 1.
Figure 3:
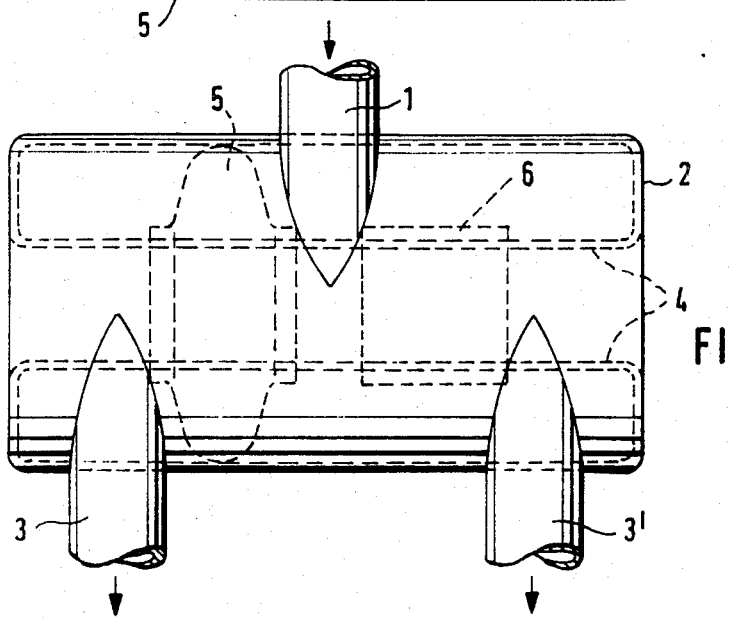
FIG. 3 is a plan view of the first pipe divider.

In general, each of the tubes 5,6 comprises a stationary portion on the side pointing toward the outer wall of the internal cylinder and a portion which can be expanded by means of compressed air, on the side pointing toward the inner wall of the distributor chamber 2. In FIGS. 2 and 3, tube 5 is shown in the expanded state, whereas tube 6 is shown in the non-expanded state. Fastening of the tubes 5,6 to the periphery of the internal cylinder can, for example, be accomplished by gluing or by means of a flange. Another variant of the pipe divider of this invention comprises a tube (diaphragm tube) which surrounds the internal cylinder 4 and has only one portion (over the entire length of the internal cylinder) which can be expanded by compressed air, whereby this tube is then fastened on the right and the left edges to the periphery of the internal cylinder about its circumference.

In the second embodiment of the pipe divider of this invention (FIGS. 4 to 6), the material is tangentially fed into a cylindrical distributor chamber 8, whereby it is subjected to an additional constraint while passing through a feed pipe 7, for the feed pipe 7 is arranged such that an imaginary continuation of its central axis results in a tangent to the distributor chamber or closely approaches a tangent to the distributor chamber. The additional constraint is due to the fact that, by this arrangement, the material is led into a "channel" within the distributor chamber 8, which extends approximately from the upper part of the line I—I to the lower part of the line I—I. The other component parts of the device can remain unchanged.

When air is admitted to the left-hand tube 5, the latter is inflated and thus blocks the path of the material to the left-hand distributor pipe 3, whereas the right-hand branch path, leading to the distributor 3', is free. On the other hand, by admitting air to the right-hand tube 6, the right-hand branch path will be blocked and the left-hand branch path will be free. If compressed air is applied to both tubes 5,6, both branch paths are blocked, and if none of the tubes 5,6 is pressurized, both branch paths are free.

The material used for the pipes, the distributor chamber and the internal cylinder can be stainless steel. About 600 to 1,000 kg per hour of the cellulose ether indicated above can be conveyed and distributed by means of a pipe divider in which the pipes have an internal diameter of 80 mm, the distributor chamber has an internal diameter of 280 mm and the internal cylinder has an external diameter of 200 mm.

What is claimed is:

1. A pipe divider for pipes used to convey solids of small particle size or dispersions, comprising:
    a generally cylindrical distribution chamber;
    a feed pipe leading essentially tangentially into distributor chamber;
    two distributor pipes leading essentially tangentially away from said distribution chamber;
    an internal cylinder, located within said distributor chamber;
    two flexible, inflatable tubes located within said distributor chamber, such that a first tube is situated between the feed pipe and a first distributor pipe, and a second tube is situated between the feed pipe and a second distributor pipe, said tubes being mounted in such a manner that they surround the internal cylinder; and
    means for selectively pressurizing each of said tubes for selectively blocking either one or both of the two distributor pipes.

2. A pipe divider as in claim 1, wherein said feed pipe is positioned such that an imaginary continuation of a line drawn along its central axis is approximately coaxial with a tangent to the periphery of the distributor chamber.

3. A pipe divider as in claim 2, wherein a channel exists in the outer wall of said distributor chamber such that the influent from said feed pipe is diverted circularly into said chamber.

4. A pipe divider as in claim 3, wherein the distance between the center axis of said chamber and the most distant internal point of said channel decreases continuously as said channel travels around said chamber from its origin at the junction with said feed pipe, until such point as that distance is approximately equal to the internal radius of said distributor chamber.

5. A pipe divider as in claim 1, wherein an imaginary continuation of the upper contour line of the feed pipe in the direction of the distributor chamber forms a tangent or runs approximately parallel with the tangent to the periphery of the distributor chamber.

6. A pipe divider as in claim 1, wherein at least one pipe is arranged in such a way that its center axis forms an angle of approximately 90° with a vertical section plane along the axis through the distributor chamber.

7. A pipe divider as in claim 1, wherein the axis of said internal cylinder is approximately coaxial with the axis of said distributor chamber.

* * * * *

UNITED STATES PATENT AND TRADEMARK OFFICE
CERTIFICATE OF CORRECTION

PATENT NO.  :  4,536,105
DATED       :  August 20, 1985
INVENTOR(S) :  Theodor Bungert It is certified that error appears in the above-identified patent and that said Letters Patent is hereby corrected as shown below:

On the title page, the inventor's name should read

-- Theodor Bungert --.

Signed and Sealed this

Twenty-sixth Day of November 1985

[SEAL]

Attest:

DONALD J. QUIGG

Attesting Officer

Commissioner of Patents and Trademarks